US009025511B2

(12) United States Patent
Zhu et al.

(10) Patent No.: US 9,025,511 B2
(45) Date of Patent: May 5, 2015

(54) METHOD AND SYSTEM FOR CONTROLLING MBMS SERVICE

(75) Inventors: Changqing Zhu, Shenzhen (CN); Bin Wang, Shenzhen (CN); Chen Lu, Shenzhen (CN); Zijiang Ma, Shenzhen (CN); Hui Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 156 days.

(21) Appl. No.: 13/819,468

(22) PCT Filed: Aug. 26, 2011

(86) PCT No.: PCT/CN2011/079012
§ 371 (c)(1),
(2), (4) Date: Feb. 27, 2013

(87) PCT Pub. No.: WO2012/028074
PCT Pub. Date: Mar. 8, 2012

(65) Prior Publication Data
US 2013/0155871 A1    Jun. 20, 2013

(30) Foreign Application Priority Data

Aug. 31, 2010   (CN) .......................... 2010 1 0271970

(51) Int. Cl.
*H04W 4/06* (2009.01)
*H04W 88/18* (2009.01)

(52) U.S. Cl.
CPC ................ *H04W 4/06* (2013.01); *H04W 88/18* (2013.01)

(58) Field of Classification Search
CPC ... H04W 4/06; H04W 76/002; H04W 76/027; H04W 72/005
USPC .............. 370/241, 241.1, 312, 328, 329, 330, 370/390, 252, 331, 335, 352, 230, 230.1, 370/310, 311, 332, 341, 401, 432, 445, 465, 370/480; 455/450, 436, 422.1, 452.1, 455/452.2, 466, 511, 522, 338, 412.2, 455/414.1, 414.2, 434, 435.2, 437, 438, 455/439, 442, 443, 447, 448, 451, 453, 454, 455/458, 464, 510, 515, 62, 69, 70
See application file for complete search history.

(56) References Cited

U.S. PATENT DOCUMENTS

2010/0265867 A1* 10/2010 Becker et al. .................. 370/312
2011/0021224 A1*  1/2011 Koskinen et al. ............. 455/507

(Continued)

FOREIGN PATENT DOCUMENTS

| CN | 101291447 A | 10/2008 |
| CN | 101374252 A | 2/2009 |

(Continued)

OTHER PUBLICATIONS

Zte, Further consideration on activation-deactivation, 3GPP TSG RAN WG3 #69, R3-102159, Madrid, Spain, Aug. 23, 2010. (6 pages—see entire document).
Orange, Use cases and discussions related to UE status report, 3GPP TSG-RAN WG2 Meeting #70bis, R2-104059, Stockholm, Sweden, Jun. 28, 2010. (5 pages—see entire document).

(Continued)

*Primary Examiner* — Bob Phunkulh
*Assistant Examiner* — Rose Clark
(74) *Attorney, Agent, or Firm* — Oppedahl Patent Law Firm LLC

(57) ABSTRACT

The disclosure provides a method for controlling a Multimedia Broadcast Multicast Service (MBMS), which includes: a network side processes uplink feedback information from User Equipment (UE) and makes an Activation/Deactivation determination on an MBMS service according to the processing result; and the network side activates/deactivates the MBMS service according to the determination result. The disclosure also provides a system for controlling an MBMS service correspondingly. The disclosure can control the activation/deactivation of an MBMS service according to uplink feedback information from UE, thereby improving system efficiency.

11 Claims, 5 Drawing Sheets

(56) References Cited

U.S. PATENT DOCUMENTS

| | | | |
|---|---|---|---|
| 2012/0008525 A1* | 1/2012 | Koskinen | 370/253 |
| 2012/0213142 A1* | 8/2012 | Van Lieshout et al. | 370/312 |
| 2014/0169258 A1* | 6/2014 | Futaki et al. | 370/312 |

FOREIGN PATENT DOCUMENTS

| | | |
|---|---|---|
| CN | 101459877 A | 6/2009 |
| JP | 2010531100 A | 9/2010 |
| WO | 2008128435 A1 | 10/2008 |

OTHER PUBLICATIONS

International Search Report in international application No. PCT/CN2011/079012, mailed on Dec. 8, 2011.
English Translation of the Written Opinion of the International Search Authority in international application No. PCT/CN2011/079012, mailed on Dec. 8, 2011.
3GPP TS 36.300 V9.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); Sep. 28, 2009. (83 pages).

* cited by examiner

METHOD AND SYSTEM FOR CONTROLLING MBMS SERVICE

TECHNICAL FIELD

The disclosure relates to the field of Multimedia Broadcast Multicast Service (MBMS), and in particular to a method and a system for controlling an MBMS service.

BACKGROUND

With the rapid development of Internet and the popularity of big-screen multi-function cell phones, a lot of mobile data multimedia services and various high-bandwidth multimedia services have emerged, such as video conference, television broadcast, video on-demand, advertisement, online education, interactive game and the like. These mobile data multimedia services and various high-bandwidth multimedia services not only meet the growing service requirements of mobile users but also bring a new business growth to mobile operators. These mobile data multimedia services and various high-bandwidth multimedia services require that multiple users can receive the same data simultaneously, and have advantages of big data amount, long duration, delay sensitivity and the like compared with general data services.

In order to utilize mobile network resources effectively, $3^{rd}$ Generation Partnership Project (3GPP) proposes an MBMS service, which is a technology of transmitting data from one data source to a plurality of targets; and this technology realizes sharing of network resources (including a core network and an access network) and improves the utilization of the network resources (particularly air interface resources). The MBMS service defined by the 3GPP not only can realize multicast and broadcast of low-rate messages in plain text, but also can realize multicast and broadcast of high-rate multimedia services and provide a variety of videos, audios and multimedia services. The MBMS service undoubtedly follows the trend of the future development of mobile data and provides a better business prospect for the development of 3G digital communication.

At present, the MBMS service is introduced into a Long Term Evolution (LTE) Release 9 (R9) system and is optimized in LTE Release 10 (R10). The bearing of MBMS services in a system is implemented by transmission of both control signaling (also called MBMS control signaling) and user data (also called MBMS service), wherein the control signaling would inform a receiving end (for example, a terminal and User Equipment (UE)) of corresponding control parameters, guiding the UE to a corresponding location to receive the MBMS service (that is, corresponding user data) the UE is interested in.

The control signalling is transmitted through a Multicast Control Channel (MCCH), a Broadcast Control Channel (BCCH) and MCH Scheduling Information (MSI) in the LTE R9, R10 system; and the MBMS service is transmitted through a Multicast Traffic Channel (MTCH).

The MBMS control signalling and the MBMS service are transmitted through an MBMS Single Frequency Network Area (MBSFN Area). The MBSFN Area consists of a series of cells, generally including one or more cells controlled by an evolved Node B (eNB). FIG. 1 shows a logic structure diagram of an MBSFN area; as shown in FIG. 1, this MBSFN area (in the circle) includes 19 cells, wherein an eNB1 controls Cell1, Cell 2, . . . , Cell 6; an eNB2 controls Cell 7, Cell 8, . . . , Cell 13; and an eNB3 controls Cell 14, Cell 15, . . . , Cell 19.

In a conventional art, the transmission of control signalling and the transmission of user data in the MBSFN Area (the MBSFN area consisting of 19 cells in the circle shown in FIG. 1) are conducted simultaneously with the cell or eNB as a unit by adopting the MBSFN technique (with purpose of enabling the UE to obtain corresponding merging gain when receiving data), wherein the MBSFN technique requires each cell in the MBSFN area to send same data content on same time-frequency resources; in this way, the resources of each cell needs to be scheduled and planned uniformly. At present, a Multi-cell/Multicast Coordination Entity (MCE) network element is used to perform uniform scheduling and planning of radio resources, and the specific operation can be referred to international standard 3GPP 36.300 v910.

FIG. 2 shows a structure diagram of an existing MBMS control system; as shown in FIG. 2, in the existing system, MBMS related network elements include an eNB, an MCE, an MBMS Gateway (MBMS GW), a Broadcast Multicast Service Centre (BM-SC) and an Mobility Management Entity (MME), wherein the BM-SC serves as a network element for starting service (Session Start), stopping service (Session Stop), updating service (Session Updated) or supplying MBMS service data; the MBMS GW sends MBMS service data to a corresponding eNB through an M1 interface; and the MBMS GW sends control plane information (for example, Session Start message, Session Stop message, Session Updated message) generated by the BM-SC to the MME through an Sm interface; the MME totally serves as a forwarding network element to forward the control plane information sent from the MBMS GW to the MCE through an M3 interface; and the MCE sends corresponding control plane information to a corresponding eNB; with such processing, the eNB would acquire the MBMS service data and the corresponding control plane information.

In order to manage the configuration of network elements conveniently, an Operation, Administration and Maintenance (OAM) unit is introduced for the network element, for example, an eNB and the OAM of the eNB, MCE and the OAM of the MCE, and the like; through the OAM unit, a network administrator (for example, an operator's network administrator) can perform a series of configuration management operations, such as viewing a status, making a determination and setting parameters, for corresponding network elements conveniently, and thus man-machine interaction and operation maintenance function are realized.

Hereinafter, an MBMS Session Start procedure is described by taking how to transmit an MBMS service in a network for example; FIG. 3 shows a flowchart of transmitting an MBMS service in a conventional art; as shown in FIG. 3. MBMS service transmission (or called bearing) is initiated by a BM-SC; the BM-SC sends an MBMS Session Start Request message to an MME, wherein this message contains a control parameter of the transmitted MBMS service; the MME forwards this Request message to an MCE; than the MCE makes a determination based on whether the MBMS service can be transmitted on an air interface right now (the basis for the determination is whether air interface resources are sufficient), and returns an MBMS Session Start Response message to the MME according to the determination result, wherein the Response message includes the determination result from the MCE; if the determinate result is that the MBMS service can not be born, then this process is ended: if the determination result is that the MBMS service can be born, then the MCE sends the MBMS Session Start Request message to the involved eNB; then the eNB plans to bear the MBMS service on an air interface (the interface from the eNB to the UE) according to the Request message and the eNB returns an MBMS Session Start response message to the network element MCE; finally, the eNB sends an MBMS Session Start request message on the air interface (in the form of MBMS notification and updated MCCH); and next, the eNB starts to transmit the MBMS service data on the air interface; in this way, the bearing of the MBMS service is completed; for further detailed content, pleas refer to 3GPP 36.300 protocol.

From the above content we can see that the MBMS service would be transmitted in an entire MBSFN area. To further optimize the transmission of MBMS service, the industry intends to introduce an uplink feedback mechanism of UE, specifically, the uplink feedback mechanism is mainly used for a network side to acquire the number of users (or number of UEs) who are interested in/receiving each MBMS service; the network side optimizes the transmission of MBMS services by acquiring the number of users, for example, deactivating (or called not transmitting) the MBMS service of which the number of users who are interested in/receiving the MBMS service is relatively small, and activating (or called transmitting) the MBMS service of which the number of users who are interested in/receiving the MBMS service is relatively large. To acquire the number of UEs (exists or not) which are interested in/receiving a certain MBMS service, the network side can send a counting command to enable the UE which is interested in/receiving the MBMS service to provide uplink feedback and tell the current state of the UE receiving an MBMS. The network side can perform an activation or deactivation operation on an MBMS service according to the information (the number of UEs which are interested in/receiving a certain MBMS) acquired through the uplink feedback; in other words, the network side can decide whether to transmit an MBMS service on the air interface according to the information acquired through the uplink feedback.

However, after UE reports an MBMS service that the UE is interested in/receiving to an eNB through an air interface, how to control the activation/deactivation of the MBMS service according to received report information by a network side can not be implemented in a conventional art.

SUMMARY

In view of the above, the main purpose of the disclosure is to provide a method and a system for controlling an MBMS service, which can control the activation/deactivation of the MBMS service according to uplink feedback information from UE, thereby improving system efficiency.

In order to achieve the purpose above, the technical scheme of the disclosure is realized as follows.

A method for controlling an MBMS service is provided, which includes:

processing uplink feedback information from UE and making an Activation/Deactivation determination on an MBMS service according to a processing result, by a network side.

The processing uplink feedback information from UE by an network side may include: gathering statistics according to collected uplink feedback information and sending a statistical result to an MCE, by an eNB;

the making an Activation/Deactivation determination on an MBMS service according to a processing result by an network side may include: determining, by the MCE, whether it is needed to activate/deactivate a corresponding MBMS service according to the statistical result from the eNB, or, further reporting, by the MCE, the statistical result to an OAM of the MCE, which then determines whether it is needed to activate/deactivate the corresponding MBMS service according to the statistical result from the eNB.

The uplink feedback information may be an MBMS service the UE is interested in or an MBMS service the UE is receiving;

the gathering statistics, by an eNB, according to collected uplink feedback information may include: gathering statistics of corresponding UE which is interested in/receiving the MBMS service;

the determining, by the MCE, whether it is needed to activate/deactivate a corresponding MBMS service according to the statistical result from the eNB may include: adding the statistical result of the MBMS service from each eNB; if the sum is not less than a corresponding threshold, determining that it is needed to activate the corresponding MBMS service; if the sum is less than the corresponding threshold, determining that it is needed to deactivate the corresponding MBMS service;

the determining, by an OAM of the MCE, whether it is needed to activate/deactivate the corresponding MBMS service according to the statistical result from the eNB may include: determining whether it is needed to activate/deactivate the corresponding MBMS service according to the statistical result from the eNB by OAM software or manually.

The processing uplink feedback information from UE by a network side may include:

gathering statistics, by an eNB, according to collected uplink feedback information;

making a preliminary determination, by the eNB, on whether it is needed to activate/deactivate the MBMS service according to a statistical result, or, further reporting, by the eNB, the statistical result to an OAM of the eNB, which then makes a preliminary determination on whether it is needed to activate/deactivate the MBMS service according to the statistical result, and sending, by the eNB, a preliminary determination result to an MCE;

the making an Activation/Deactivation determination on an MBMS service according to a processing result by a network side may include: finally determining, by the MCE, whether it is needed to activate/deactivate a corresponding MBMS service according to the preliminary determination result from the eNB, or, further reporting, by the MCE, the preliminary determination result from the eNB to the OAM of the MCE, which then finally determines whether it is needed to activate/deactivate the corresponding MBMS service according to the preliminary determination result from the eNB.

The uplink feedback information may be an MBMS service the UE is interested in or an MBMS service the UE is receiving;

the gathering statistics, by an eNB, according to collected uplink feedback information may include: gathering statistics of corresponding UE which is interested in/receiving the MBMS service;

the making a preliminary determination, by the eNB, on whether it is needed to activate/deactivate the MBMS service according to a statistical result may include: if the statistical result of the MBMS service is not less than a corresponding threshold, then determining that it is needed to activate a corresponding MBMS service; if the statistical result of the MBMS service is less than the corresponding threshold, then determining that it is needed to deactivate the corresponding MBMS service;

the making a preliminary determination, by an OAM of the eNB, on whether it is needed to activate/deactivate the MBMS service according to the statistical result may include: making a preliminary determination on whether it is needed to activate/deactivate the MBMS service according to the statistical result by OAM software or manually;

the finally determining, by the MCE, whether it is needed to activate/deactivate a corresponding MBMS service according to the preliminary determination result from the eNB may include: according to the preliminary determination result of the MBMS service from each eNB, determining, by the MCE, that it is needed to activate the MBMS service if the number/percentage of eNBs with preliminary determination results of "Activation Needed" is not less than the number/percentage of eNBs with preliminary determination results of "Deactivation Needed", and determining, by the MCE, that it is needed to deactivate the MBMS service if the number/percentage of eNBS with preliminary determination results of "Activation Needed" is less than the number/percentage of eNBs with preliminary determination results of "Deactivation Needed";

the finally determining, by the OAM of the MCE, whether it is needed to activate/deactivate the corresponding MBMS service according to the preliminary determination result from the eNB may include: finally determining whether it is needed to activate/deactivate the corresponding MBMS service according to the preliminary determination result from the eNB by OAM software or manually.

The processing uplink feedback information from UE by a network side may include:

forwarding, by an eNB, the uplink feedback information from the UE to an MCE;

gathering statistics, by the MCE, according to collected uplink feedback information;

the making an Activation/Deactivation determination on an MBMS service according to a processing result by the network side may include: determining, by the MCE, whether it is needed to activate/deactivate a corresponding MBMS service according to a statistical result, or, further reporting, by the MCE, the statistical result to an OAM of the MCE, which then determines whether it is needed to activate/deactivate the corresponding MBMS service according to the statistical result.

The uplink feedback information may be an MBMS service the UE is interested in or an MBMS service the UE is receiving;

the gathering statistics, by the MCE, according to collected uplink feedback information may include: gathering statistics of corresponding UE which is interested in/receiving the MBMS service;

the determining, by the MCE, whether it is needed to activate/deactivate a corresponding MBMS service according to the statistical result may include: if the statistical result of the MBMS service is not less than a corresponding threshold, then determining that it is needed to activate the corresponding MBMS service; if the statistical result of the MBMS service is less than the corresponding threshold, then determining that it is needed to deactivate the corresponding MBMS service;

the determining, by an OAM of the MCE, whether it is needed to activate/deactivate the corresponding MBMS service according to the statistical result may include: determining whether it is needed to activate/deactivate the corresponding MBMS service according to the statistical result by OAM software or manually.

A method for controlling an MBMS service is provided, which includes: activating/deactivating an MBMS service according to a determination result of the MBMS service, by a network side.

In the condition that the MBMS service is an MBMS service being transmitted, the activating/deactivating an MBMS service according to a determination result of the MBMS service by a network side may include:

if the determination result is a Deactivation determination, then sending, by an MCE, the determination result to a BM-SC through an MME, and after the BM-SC receives the determination result sent from the MCE, initiating, by the BM-SC, an MBMS Session Stop procedure of the MBMS service; if the determination result is an Activation determination, then sending, by the MCE, the determination result to the BM-SC through the MME, and performing no operation by the BM-SC after the BM-SC receives the determination result, or, sending no determination result by the MCE to the BM-SC, and still keeping transmission of original MBMS service;

or, if the determination result is a Deactivation determination, then directly sending, by the MCE, MBMS service Deactivation indication information to a corresponding eNB; after the corresponding eNB receives the MBMS service Deactivation indication information, stopping sending, by the corresponding eNB, corresponding MBMS service data on an air interface; if the determination result is an Activation determination, then sending, by the MCE, MBMS service Activation indication information or no information to the corresponding eNB, and continuing sending, by the corresponding eNB, the corresponding MBMS service data on the air interface.

In the condition that the MBMS service was started but currently is in a Deactivated state, the activating/deactivating an MBMS service according to a determination result of the MBMS service by a network side may include:

if the determination result is an Activation determination, then sending, by an MCE, the determination result to a BM-SC through an MME, and after the BM-SC receives the determination result sent from the MCE, initiating, by the BM-SC, an MBMS Session Start procedure of a corresponding MBMS service; if the determination result is a Deactivation determination, then sending, by the MCE, the Deactivation determination to the BM-SC through the MME, and after the BM-SC receives the Deactivation determination, performing no operation by the BM-SC and keeping a non-transmission state of original MBMS service, or, not sending the determination result by the MCE to the BM-SC, and still keeping a non-transmission state of original MBMS service;

or, if the determination result is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface; if the determination result is a Deactivation determination, then sending, by the MCE, MBMS service Deactivation indication information or no information to the corresponding eNB, and not sending, by the corresponding eNB, the corresponding MBMS service data on the air interface.

In the condition that the MBMS service has never been started, the activating/deactivating an MBMS service according to a determination result of the MBMS service by a network side may include:

saving, by an MCE, the determination result of the MBMS service; when a BM-SC initiates an MBMS Session Start procedure of the MBMS service, establishing or rejecting, by the MCE, bearing of the MBMS service according to the saved determination result.

A method for controlling an MBMS service is provided, which includes:

processing uplink feedback information from UE and making an Activation/Deactivation determination on an MBMS service according to a processing result, by a network side; and activating/deactivating the MBMS service according to a determination result, by the network side.

The processing uplink feedback information from UE by a network side may include: gathering statistics according to collected uplink feedback information and sending a statistical result to an MCE, by an eNB;

the making an Activation/Deactivation determination on an MBMS service according to a processing result by a network side may include: determining, by the MCE, whether it is needed to activate/deactivate a corresponding MBMS service according to the statistical result from the eNB, or, further reporting, by the MCE, the statistical result to an OAM of the MCE, which then determines whether it is needed to activate/deactivate the corresponding MBMS service according to the statistical result from the eNB.

The processing uplink feedback information from UE by a network side may include:

gathering statistics, by an eNB, according to collected uplink feedback information;

making a preliminary determination, by the eNB, on whether it is needed to activate/deactivate the MBMS service according to the statistical result, or, further reporting, by the eNB, the statistical result to an OAM of the eNB, which then makes a preliminary determination on whether it is needed to activate/deactivate the MBMS service according to the statistical result, and sending, by the eNB, a preliminary determination result to the MCE;

the making an Activation/Deactivation determination on an MBMS service according to a processing result by a network side may include: finally determining, by the MCE, whether it is needed to activate/deactivate a corresponding MBMS service according to the preliminary determination result from the eNB, or, further reporting, by the MCE, the preliminary determination result from the eNB to an OAM of the MCE, which then finally determines whether it is needed to activate/deactivate the corresponding MBMS service according to the preliminary determination result from the eNB.

The processing uplink feedback information from UE by a network side may include:

forwarding, by an eNB, the uplink feedback information from the UE to an MCE;

gathering statistics, by the MCE, according to collected uplink feedback information;

the making an Activation/Deactivation determination on an MBMS service according to a processing result by a network side may include: determining, by the MCE, whether it is needed to activate/deactivate a corresponding MBMS service according to a statistical result, or, further reporting, by the MCE, the statistical result to an OAM of the MCE, which then determines whether it is needed to activate/deactivate the corresponding MBMS service according to the statistical result.

In the condition that the MBMS service is an MBMS service being transmitted, the activating/deactivating the MBMS service according to a determination result of the MBMS service by the network side may include:

if the determination result is a Deactivation determination, then sending, by the MCE, the determination result to a BM-SC through an MME, and after the BM-SC receives the determination result sent from the MCE, initiating, by the BM-SC, an MBMS Session Stop procedure of the MBMS service; if the determination result is an Activation determination, then sending, by the MCE, the determination result to the BM-SC through the MME, and after the BM-SC receives the determination result, performing no operation by the BM-SC, or, sending no determination result by the MCE to the BM-SC, and still keeping transmission of original MBMS service;

or, if the determination result is a Deactivation determination, then directly sending, by the MCE, MBMS service Deactivation indication information to a corresponding eNB, and after the corresponding eNB receives the MBMS service Deactivation indication information, stopping sending, by the corresponding eNB, corresponding MBMS service data on an air interface; if the determination result is an Activation determination, sending, by the MCE, MBMS service Activation indication information or no information to the corresponding eNB, and continuing sending, by the corresponding eNB, the corresponding MBMS service data on the air interface.

In the condition that the MBMS service was started but currently is in a Deactivated state, the activating/deactivating the MBMS service according to a determination result of the MBMS service by the network side may include:

if the determination result is an Activation determination, then sending, by the MCE, the determination result to a BM-SC through an MME, and after the BM-SC receives the determination result sent from the MCE, initiating, by the BM-SC, an MBMS Session Start procedure of a corresponding MBMS service; if the determination result is a Deactivation determination, then sending, by the MCE, the Deactivation determination to the BM-SC through the MME, and after the BM-SC receives the Deactivation determination, performing no operation by the BM-SC and keeping a non-transmission state of original MBMS service, or, not sending the determination result by the MCE to the BM-SC, and still keeping a non-transmission state of original MBMS service;

or, if the determination result is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface; if the determination result is a Deactivation determination, then sending, by the MCE, MBMS service Deactivation indication information or no information to the corresponding eNB, and not sending, by the corresponding eNB, the corresponding MBMS service data on the air interface.

In the condition that the MBMS service has never been started, the activating/deactivating the MBMS service according to a determination result of the MBMS service by the network side may include:

saving, by the MCE, the determination result of the MBMS service; when an BM-SC initiates an MBMS Session Start procedure of the MBMS service, establishing or rejecting, by the MCE, bearing of the MBMS service according to the saved determination result.

A system for controlling an MBMS service is provided, which includes a network side and UE, wherein the network side is configured to process uplink feedback information from the UE and to make an Activation/Deactivation determination on an MBMS service according to a processing result.

The network side may include: an eNB and an MCE, in which the eNB is configured to gather statistics according to collected uplink feedback information and to send a statistical result to the MCE; and the MCE is configured to determine whether it is needed to activate/deactivate a corresponding MBMS service according to the statistical result from the eNB.

The network side may include: an eNB, an MCE, and an OAM of the MCE, in which the eNB is configured to gather statistics according to collected uplink feedback information and to send a statistical result to the MCE;

the MCE is configured to further report the statistical result to the OAM of the MCE; and the OAM of the MCE is configured to determine whether it is needed to activate/deactivate a corresponding MBMS service according to the statistical result from the eNB.

The network side may include: an eNB and an MCE, in which the eNB is configured to gather statistics according to collected uplink feedback information, to make a preliminary determination on whether it is needed to activate/deactivate the MBMS service according to a statistical result and to send a preliminary determination result to the MCE; and the MCE is configured to finally determine whether it is needed to activate/deactivate a corresponding MBMS service according to the preliminary determination result from the eNB.

The network side may include: an eNB, an OAM of the eNB, and an MCE, in which the eNB is configured to gather statistics according to collected uplink feedback information and to send a statistical result to the OAM of the eNB;

the OAM of the eNB is configured to make a preliminary determination on whether it is needed to activate/deactivate the MBMS service according to the statistical result and to send a preliminary determination result to the MCE through the eNB; and the MCE is configured to finally determine whether it is needed to activate/deactivate a corresponding MBMS service according to the preliminary determination result from the eNB.

The network side may include: an eNB, an MCE, and an OAM of the MCE, in which the eNB is configured to gather statistics according to collected uplink feedback information, to make a preliminary determination on whether it is needed to activate/deactivate the MBMS service according to a statistical result and to send a preliminary determination result to the MCE;

the MCE is configured to report the preliminary determination result from the eNB to the OAM of the MCE; and the OAM of the MCE is configured to finally determine whether it is needed to activate/deactivate a corresponding MBMS service according to the preliminary determination result from the eNB.

The network side may include: an eNB and an MCE, in which the eNB is configured to forward the uplink feedback information from the UE to the MCE; and the MCE is configured to gather statistics according to collected uplink feedback information and to determine whether it is needed to activate/deactivate a corresponding MBMS service according to a statistical result.

The network side may include: an eNB, an MCE, and an OAM of the MCE, in which the eNB is configured to forward the uplink feedback information from the UE to the MCE;

the MCE is configured to gather statistics according to collected uplink feedback information and to report the statistical result to the OAM of the MCE; and the OAM of the MCE is configured to determine whether it is needed to activate/deactivate a corresponding MBMS service according to the statistical result.

A system for controlling an MBMS service is provided, which is configured to activate/deactivate an MBMS service according to a determination result of the MBMS service.

The system specifically may include an MCE, an MME and a BM-SC, wherein the MCE is configured to send the determination result to the BM-SC through the MME or not send the determination result to the BM-SC; and the BM-SC is configured to initiate an MBMS Session Stop procedure of the MBMS service or perform no operation after receiving the determination result from the MCE.

The system specifically may include an MCE and an eNB, wherein the MCE is configured to directly send indication information to a corresponding eNB according to the determination result or not send indication information; and the eNB is configured to perform a corresponding operation according to the indication information or perform no operation.

The system specifically may include an MCE and a BM-SC, wherein the MCE is configured to save the determination result of the MBMS service and to establish or reject bearing of the MBMS service according to the saved determination result when the BM-SC initiates an MBMS Session Start procedure of the MBMS service.

A system for controlling an MBMS service is provided, which includes a network side and UE, wherein the network side is configured to process uplink feedback information from the UE, to make an Activation/Deactivation determination on an MBMS service according to a processing result and to activate/deactivate the MBMS service according to a determination result.

Processing the uplink feedback information from the UE and activating/deactivating the MBMS service according to the processing result by the network side may include:

gathering statistics according to collected uplink feedback information and sending a statistical result to an MCE, by an eNB; determining, by the MCE, whether it is needed to activate/deactivate a corresponding MBMS service according to the statistical result from the eNB, or, further reporting, by the MCE, the statistical result to an OAM of the MCE, which then determines whether it is needed to activate/deactivate the corresponding MBMS service according to the statistical result from the eNB;

or, gathering statistics, by the eNB, according to collected uplink feedback information; making a preliminary determination, by the eNB, on whether it is needed to activate/deactivate the MBMS service according to a statistical result, or, further reporting, by the eNB, the statistical result to an OAM of the eNB, which then makes a preliminary determination on whether it is needed to activate/deactivate the MBMS service according to the statistical result, and sending, by the eNB, a preliminary determination result to the MCE; finally determining, by the MCE, whether it is needed to activate/deactivate a corresponding MBMS service according to the preliminary determination result from the eNB, or, further reporting, by the MCE, the preliminary determination result from the eNB to the OAM of the MCE, which then finally determines whether it is needed to activate/deactivate the corresponding MBMS service according to the preliminary determination result from the eNB;

or, forwarding, by the eNB, the uplink feedback information from the UE to the MCE; gathering statistics, by the MCE, according to collected uplink feedback information; determining, by the MCE, whether it is needed to activate/deactivate a corresponding MBMS service according to a statistical result, or, further reporting, by the MCE, the statistical result to the OAM of the MCE, which then determines whether it is needed to activate/deactivate the corresponding MBMS service according to the statistical result.

Activating/deactivating the MBMS service according to the determination result of the MBMS service by the network side may include: if the determination result is a Deactivation determination, then sending, by the MCE, the determination result to a BM-SC through an MME, and after the BM-SC receives the determination result sent from the MCE, initiating, by the BM-SC, an MBMS Session Stop procedure of the MBMS service; if the determination result is an Activation determination, then sending, by the MCE, the determination result to the BM-SC through the MME, and after the BM-SC receives the determination result, performing no operation by the BM-SC, or, sending no determination result by the MCE to the BM-SC, and still keeping transmission of original MBMS service;

or, if the determination result is a Deactivation determination, then directly sending, by the MCE, MBMS service Deactivation indication information to a corresponding eNB, and after the corresponding eNB receives the MBMS service Deactivation indication information, stopping sending, by the corresponding eNB, corresponding MBMS service data on an air interface; if the determination result is an Activation determination, then sending, by the MCE, MBMS service Activation indication information or no information to the corresponding eNB, and continuing sending, by the corresponding eNB, the corresponding MBMS service data on the air interface.

Activating/deactivating the MBMS service according to the determination result of the MBMS service by the network side may include:

if the determination result is an Activation determination, then sending, by the MCE, the determination result to an BM-SC through an MME, and after the BM-SC receives the determination result sent from the MCE, initiating, by the BM-SC, an MBMS Session Start procedure of a corresponding MBMS service; if the determination result is a Deactivation determination, then sending, by the MCE, the Deactivation determination to the BM-SC through the MME, and after the BM-SC receives the Deactivation determination, performing no operation by the BM-SC and keeping a no-transmission state of original MBMS service, or, sending no determination result by the MCE to the BM-SC, and still keeping a no-transmission state of original MBMS service;

or, if the determination result is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface; if the determination result is a Deactivation determination, then sending, by the MCE, MBMS service Deactivation indication information or no information to the corresponding eNB, and not sending, by the corresponding eNB, the corresponding MBMS service data on the air interface.

Activating/deactivating the MBMS service according to the determination result of the MBMS service by the network side may include: saving, by the MCE, the determination result of the MBMS service; when a BM-SC initiates an MBMS Session Start procedure of the MBMS service, establishing or rejecting, by the MCE, bearing of the MBMS service according to the saved determination result.

With the method and the system for controlling an MBMS service provided in the disclosure, a network side processes uplink feedback information from UE and makes an Activation/Deactivation determination on an MBMS service according to a processing result; and the network side activates/deactivates the MBMS service according to a determination result. The disclosure can control the activation/deactivation of an MBMS service according to uplink feedback information from UE, thereby improving system efficiency.

DETAILED DESCRIPTION

The basic concept of the disclosure is that: a network side processes uplink feedback information from UE and makes an Activation/Deactivation determination on an MBMS service according to the processing result; and the network side activates/deactivates the MBMS service according to the determination result.

Figure 1:
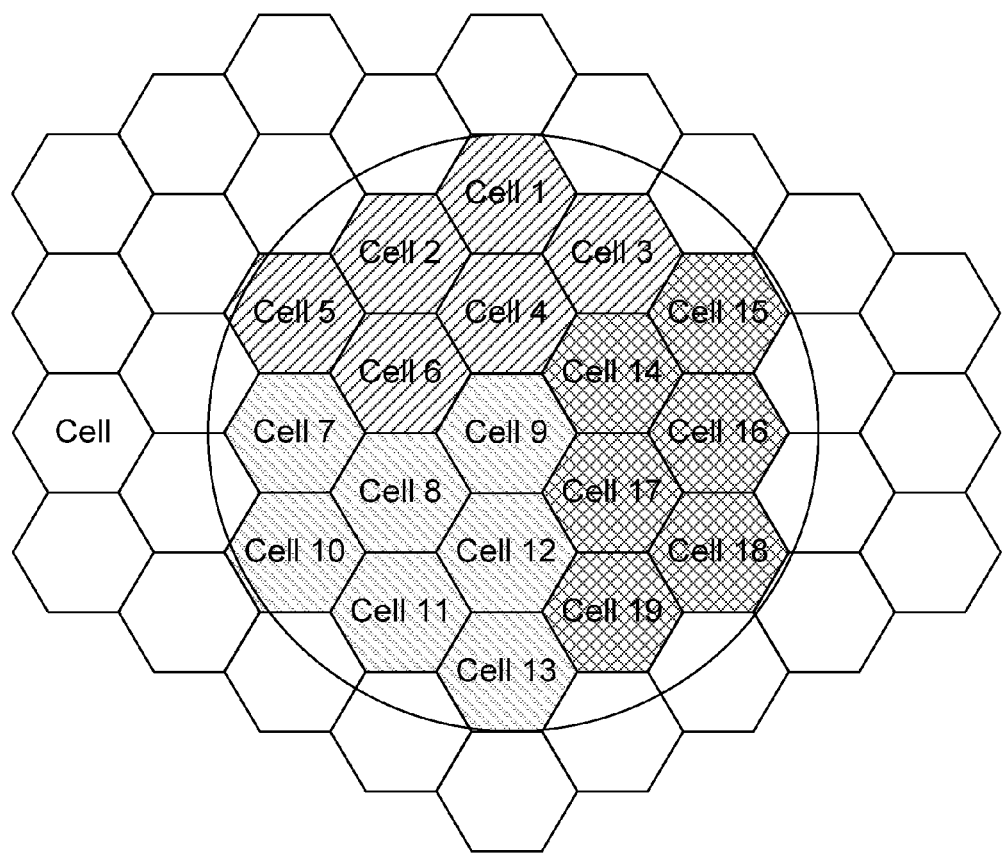
FIG. 1 shows a logic structure diagram of an existing MBSFN area.
Figure 2:
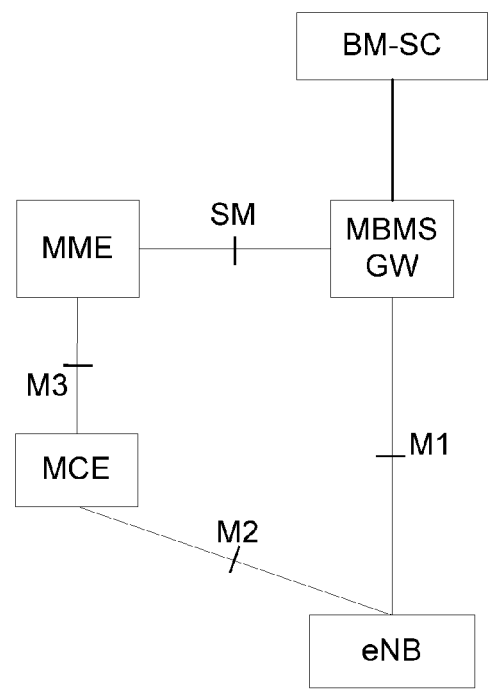
FIG. 2 shows a structure diagram of an existing MBMS control system.
Figure 3:
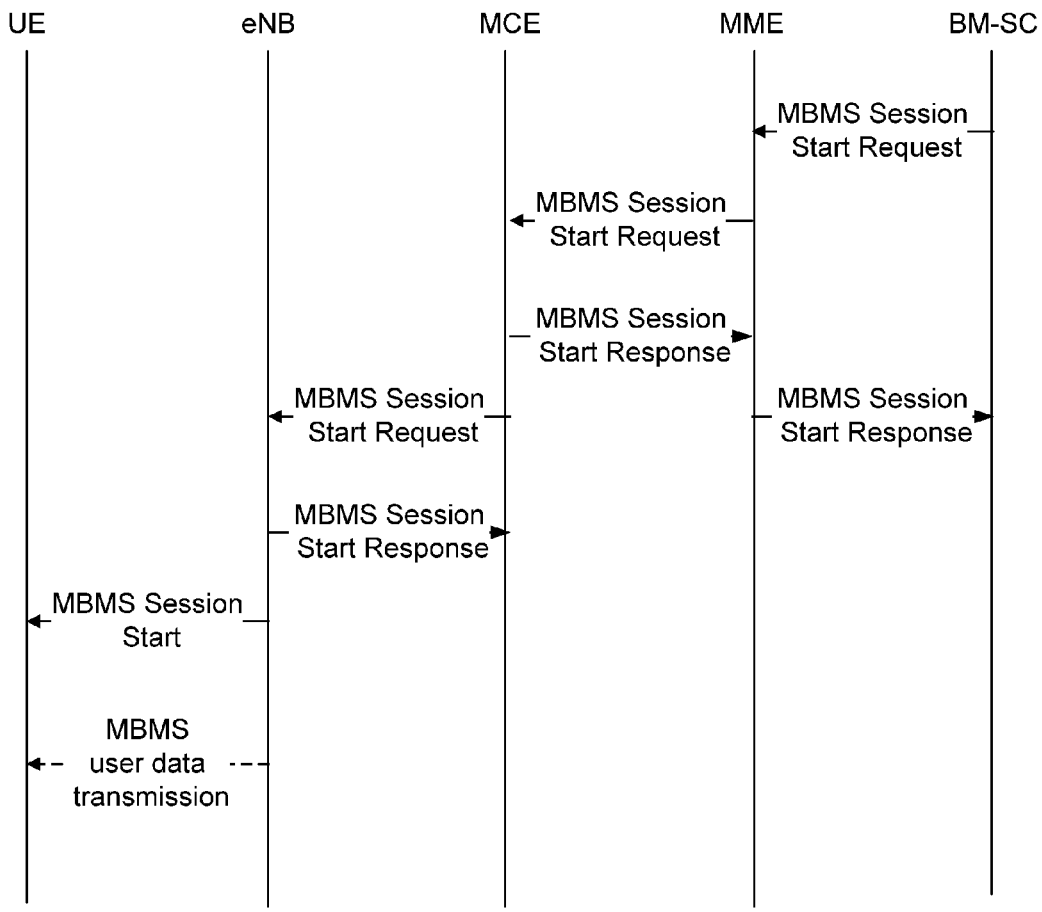
FIG. 3 shows a flowchart of transmitting an MBMS service in a conventional art.
Figure 4:
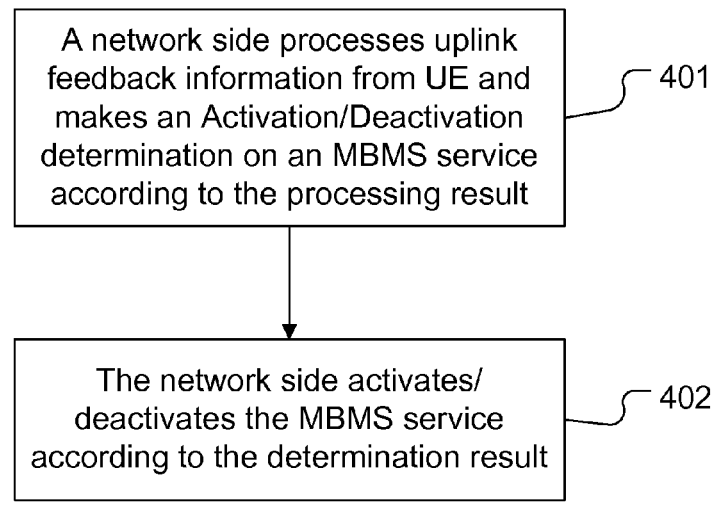
FIG. 4 shows a flowchart of a method for controlling an MBMS service in an embodiment of the disclosure.

FIG. 4 shows a flowchart of a method for controlling an MBMS service in the embodiment of the disclosure; as shown in FIG. 4, the method includes:

Step 401: a network side processes uplink feedback information from UE and makes an Activation/Deactivation determination on an MBMS service according to the processing result.

Here, the uplink feedback information may be an MBMS service the UE is interested in or an MBMS service the UE is receiving, and etc.; an receiving network element at the network side is an eNB where the UE resides. The eNB collects uplink feedback information of a cell which is in the charge of the eNB itself, in other words, the uplink feedback information collected by the eNB is from one or more UEs providing uplink feedback in a plurality of cells which are in the charge of the eNB itself; and Step 402: the network side activates/deactivates the MBMS service according to the determination result.

Step 401 specifically can be implemented by the following ways.

Figure 5:
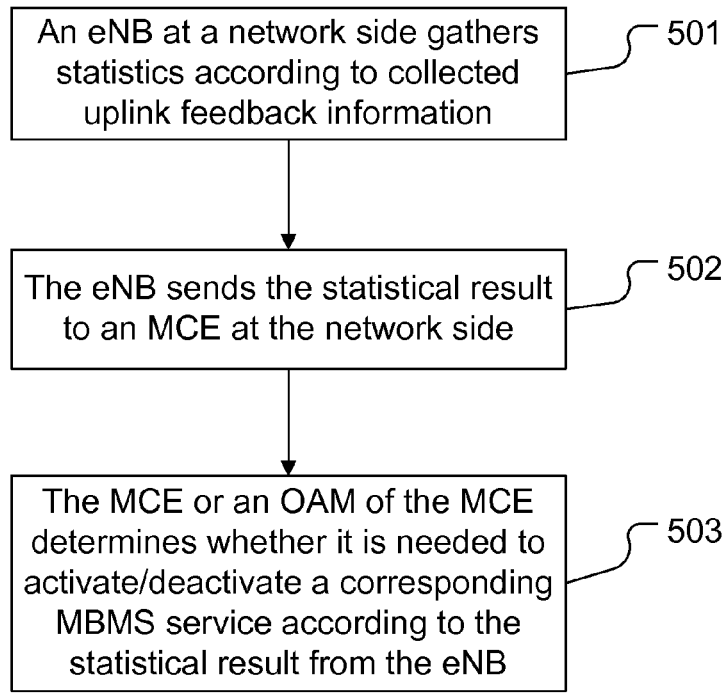
FIG. 5 shows a flowchart of a network side determining whether it is needed to activate/deactivate a corresponding MBMS service according to uplink feedback information from UE in an embodiment of the disclosure.

FIG. 5 shows a flowchart of a network side processing uplink feedback information from UE and making an Activation/Deactivation determination on an MBMS service according to the processing result in an embodiment of the disclosure; as shown in FIG. 5, the process includes the following steps.

Step 501: an eNB at the network side gathers statistics according to collected uplink feedback information.

Here, gathering statistics according to the collected uplink feedback information by the eNB may include: gathering statistics of the corresponding UE which is interested in/receiving the MBMS service (the simplest statistical method is counting).

It should be noted that the MBM service counted by the eNB can be one or more MBMS services.

Step 502: the eNB sends the statistical result to an MCE at the network side.

Generally, the statistical result of the eNB can be reported to an OAM of the MCE through the MCE.

Step 503: the MCE or the OAM of the MCE determines whether it is needed to activate/deactivate a corresponding MBMS service according to the statistical result from the eNB.

In the condition that the determination is made by the OAM of the MCE, the MCE needs to further report the statistical result to the OAM of the MCE.

Here, the MCE makes an Activation/Deactivation determination on the MBMS service in an entire MBSFN area according to the statistical result from the eNB. Specifically, for a specific MBMS service, the MCE can add the statistical result of the MBMS service from each eNB to get a sum, if the sum is not less than a corresponding threshold, the MCE determines that it is needed to activate the MBMS service, and generates a determination result of "True" or "1", indicating that the MBMS service should be transmitted (Activation); if the sum is less than the corresponding threshold, the MCE determines that it is needed to deactivate the MBMS service, and generates a determination result of "False" or "1", indicating that the MBMS service should not be transmitted (Deactivation).

Generally, when the determination is performed by the OAM of the MCE, the OAM of the MCE would return a determination result to the MCE. This determination is implemented manually or by OAM software.

Figure 6:
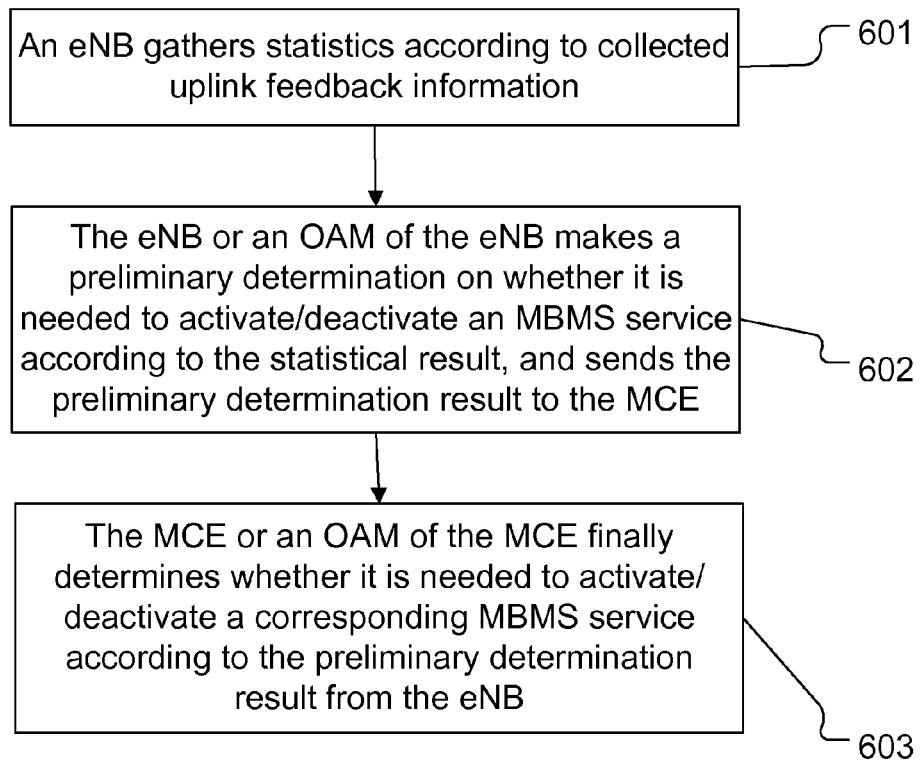
FIG. 6 shows a flowchart of a network side determining whether it is needed to activate/deactivate a corresponding MBMS service according to uplink feedback information from UE in another embodiment of the disclosure.

FIG. 6 shows a flowchart of a network side processing uplink feedback information from UE and making an Activation/Deactivation determination on an MBMS service according to the processing result in another Embodiment of the disclosure; as shown in FIG. 6, the process includes following steps.

Step 601: an eNB gathers statistics according to collected uplink feedback information.

Here, gathering statistics according to the collected uplink feedback information by the eNB may include: the eNB performs processing according to the MBMS service and gathers statistics of the corresponding UE which is interested in/receiving the MBMS service.

It should be noted that the MBM service counted by the eNB can be one or more MBMS services.

Step 602: the eNB or the OAM of the eNB makes a preliminary determination on whether it is needed to activate/deactivate the MBMS service according to the statistical result, and the eNB sends a preliminary determination result to an MCE.

In the condition that the preliminary determination is made by the OAM of the eNB, the eNB needs to further report the statistical result to the OAM of the eNB. The above step of the OAM of the eNB making a preliminary determination on whether it is needed to activate/deactivate the MBMS service according to the statistical result includes: making a preliminary determination on whether it is needed to activate/deactivate the MBMS service according to the statistical result by OAM software or manually.

Here, the eNB can compare the corresponding statistical data of each MBMS service (that is, the number of UE which is interested in/receiving the MBMS service) with a corresponding threshold; if the statistical data is not less than the threshold, it is preliminarily determined that it is needed to activate a corresponding MBMS service, and the eNB generates a preliminary determination result value of "True" or "1", indicating that the MBMS service should be transmitted (Activation); if the statistical data is less than the threshold, it is preliminarily determined that it is needed to deactivate the corresponding MBMS service, and the eNB generates a preliminary determination result value of "False" or "0", indicating that the MBMS service should not be transmitted (Deactivation).

Step 603: the MCE or the OAM of the MCE finally determines whether it is needed to activate/deactivate the corresponding MBMS service according to the preliminary determination result from the eNB.

In the condition that the determination is, made by the OAM of the MCE, the MCE also needs to report the preliminary determination result from the eNB to the OAM of the MCE.

Here, the MCE makes an Activation/Deactivation determination on the MBMS service in an entire MBSFN area according to the determination result from each eNB in the MBSFN area. Specifically, for a specific MBMS service, the MCE determines, according to the preliminary determination result of the MBMS service from each eNB, that it is needed to activate the MBMS service if the number/percentage of the eNBs with the preliminary determination results of "Activation Needed" is not less than the number/percentage of the eNBs with the preliminary determination results of "Deactivation Needed", otherwise, determines that it is needed to deactivate the MBMS service.

Generally, when the determination is made by the OAM of the MCE, the OAM of the MCE would finally return the determination result to the MCE. This determination is implemented manually or by OAM software.

Figure 7:
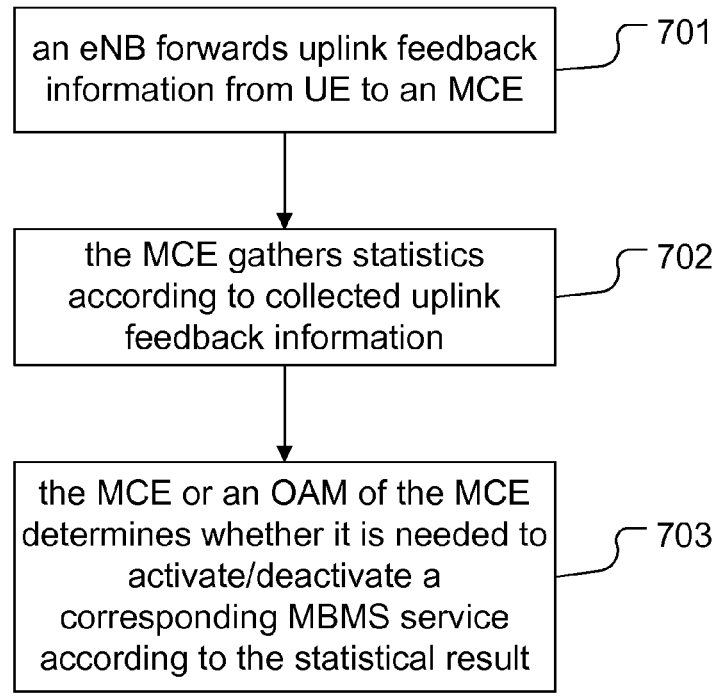
FIG. 7 shows a flowchart of a network side determining whether it is needed to activate/deactivate a corresponding MBMS service according to uplink feedback information from UE in a third embodiment of the disclosure.

FIG. 7 shows a flowchart of a network side processing uplink feedback information from UE and making an Activation/Deactivation determination on an MBMS service according to the processing result in a third embodiment of the disclosure; as shown in FIG. 7, the process includes the following steps.

Step 701: an eNB forwards the uplink feedback information from the UE to an MCE.

Step 702: the MCE gathers statistics according to collected uplink feedback information.

Here, the method of the MCE gathering statistics according to the collected uplink feedback information is similar to the method of the eNB gathering statistics according to the collected uplink feedback information in Step 601, and no detailed description is needed here.

Step 703: the MCE or the OAM of the MCE determines whether it is needed to activate/deactivate the corresponding MBMS service according to the statistical result.

In the condition that the determination is made by the OAM of the MCE, the MCE also needs to report the statistical result obtained in Step 702 to the OAM of the MCE.

The method in this step is similar to the method of the eNB or the OAM of the eNB making a preliminary determination on whether it is needed to activate/deactivate the MBMS service according to the statistical result in Step 602, and no detailed description is needed here.

From the above, it can be seen that the eNB needs to send uplink feedback information to the MCE once by adopting the process shown in FIG. 5 and FIG. 6, but probably needs to send the uplink feedback information to the MCE for more than one times by adopting the process shown in FIG. 7.

Step 402 is described in detail from the view of the state of the MBMS service, specifically, 1) in the condition that the MBMS service is an MBMS service being transmitted, activating/deactivating the MBMS service according to the determination result of the MBMS service by the network side includes:

if the determination result is a Deactivation determination, then the MCE sends the determination result to the BM-SC through an MME; after the BM-SC receives the determination result sent from the MCE, the BM-SC initiates an MBMS Session Stop procedure of the MBMS service; if the determination result is Activation, the MCE sends the determination result to the BM-SC through the MME, and after the BM-SC receives the determination result, the BM-SC performs no operation, or, the MCE sends no determination result to the BM-SC, and still keeps the transmission of the original MBMS service;

or, if the determination result is a Deactivation determination, the MCE directly sends MBMS service Deactivation indication information to a corresponding eNB, and after the eNB receives the MBMS service Deactivation indication information, the eNB stops sending, corresponding MBMS service data on an air interface; if the determination result is an Activation determination, the MCE sends MBMS service Activation indication information or no information to the eNB, and the corresponding eNB continues sending the corresponding MBMS service data on the air interface.

2) in the condition that the MBMS service was started but currently is in a Deactivated state, activating/deactivating the MBMS service according to the determination result of the MBMS service by the network side includes:

if the determination result is an Activation determination, the MCE sends the determination result to the BM-SC through the MME, and after the BM-SC receives the determination result sent from the MCE, the BM-SC initiates an MBMS Session Start procedure of a corresponding MBMS service; if the determination result is a Deactivation determination, the MCE sends the Deactivation determination to the BM-SC through the MME, and after the BM-SC receives the Deactivation determination, the BM-SC performs no operation and keeps the non-transmission state of the original MBMS service, or, the MCE sends no determination result to the BM-SC, and still keeps the non-transmission state of the original MBMS service;

or, if the determination result is an Activation determination, the MCE directly sends MBMS service Activation indication information to a corresponding eNB, and after the eNB receives the Activation indication information, the eNB starts to send the corresponding MBMS service data on an air interface; if the determination result is a Deactivation determination, the MCE sends MBMS service Deactivation indication information or no information to the eNB, and the Enb does not send the corresponding MBMS service data on the air interface.

3) in the condition that the MBMS service has never been started, activating/deactivating the MBMS service according to the determination result of the MBMS service by the network side includes:

the MCE saves the determination result of the MBMS service; when the BM-SC initiates the MBMS Session Start procedure of the MBMS service, the MCE establishes or rejects bearing of the MBMS service according to the saved determination result.

It should be noted that the Activation mentioned in the disclosure might refer to one or more of the following implications: 1. an MBMS service which has never been started (that is, the MBMS service has never been transmitted, or the MBMS service has never initiated a Session Start procedure) is ready to be transmitted; 2. an MBMS service being transmitted continues to be transmitted; 3. an MBMS service which was transmitted but currently is deactivated is retransmitted. The Deactivation mentioned in the disclosure refers to one or more of the following implications: 1. an MBMS service which has never been started is not transmitted; 2. an MBMS service being transmitted is stopped transmission; 3. an MBMS service which has been transmitted but currently is deactivated still is not transmitted.

The disclosure also provides a system for controlling an MBMS service, which includes a network side and UE, wherein the network side is configured to process uplink feedback information from the UE and to make an Activation/Deactivation determination on MBMS service according to the processing result.

The network side includes: an eNB and an MCE, in which the eNB is configured to gather statistics according to collected uplink feedback information and to send the statistical result to the MCE; and the MCE is configured to determine whether it is needed to activate/deactivate a corresponding MBMS service according to the statistical result from the eNB.

The network side includes: an eNB, an MCE, and an OAM of the MCE, in which the eNB is configured to gather statistics according to collected uplink feedback information and to send the statistical result to the MCE;

the MCE is configured to further report the statistical result to the OAM of the MCE; and the OAM of the MCE is configured to determine whether it is needed to activate/deactivate a corresponding MBMS service according to the statistical result from the eNB.

The network side includes: an eNB and an MCE, in which the eNB is configured to gather statistics according to collected uplink feedback information, to make a preliminary determination on whether it is needed to activate/deactivate the MBMS service according to the statistical result and to send the preliminary determination result to the MCE; and the MCE is configured to finally determine whether it is needed to activate/deactivate a corresponding MBMS service according to the preliminary determination result from the eNB.

The network side includes: an eNB, an OAM of the eNB, and an MCE, in which the eNB is configured to gather statistics according to collected uplink feedback information and to send the statistical result to the OAM of the eNB;

the OAM of the eNB is configured to make a preliminary determination on whether it is needed to activate/deactivate the MBMS service according to the statistical result and to send the preliminary determination result to the MCE through the eNB; and the MCE is configured to finally determine whether it is needed to activate/deactivate a corresponding MBMS service according to the preliminary determination result from the eNB.

The network side includes: an eNB, an MCE, and an OAM of the MCE, in which the eNB is configured to gather statistics according to collected uplink feedback information, to make a preliminary determination on whether it is needed to activate/deactivate the MBMS service according to the statistical result and to send the preliminary determination result to the MCE;

the MCE is configured to report the preliminary determination result from the eNB to the OAM of the MCE; and the OAM of the MCE is configured to finally determine whether it is needed to activate/deactivate a corresponding MBMS service according to the preliminary determination result from the eNB.

The network side includes: an eNB and an MCE, in which the eNB is configured to forward uplink feedback information from the UE to the MCE; and the MCE is configured to gather statistics according to collected uplink feedback information and to determine whether it is needed to activate/deactivate a corresponding MBMS service according to the statistical result.

The network side includes: an eNB, an MCE, and an OAM of the MCE, in which the eNB is configured to forward uplink feedback information from the UE to the MCE;

the MCE is configured to gather statistics according to collected uplink feedback information and to report the statistical result to the OAM of the MCE; and the OAM of the MCE is configured to determine whether it is needed to activate/deactivate a corresponding MBMS service according to the statistical result.

The disclosure also provides a system for controlling an MBMS service, which is configured to activate/deactivate an MBMS service according to a determination result of the MBMS service.

The system specifically includes an MCE, an MME and a BM-SC, wherein the MCE is configured to send the determination result to the BM-SC through the MME or not send the determination result to the BM-SC; and the BM-SC is configured to initiate an MBMS Session Stop procedure of the MBMS service or perform no operation after receiving the determination result from the MCE.

The system specifically includes an MCE and an eNB, wherein the MCE is configured to directly send indication information to a corresponding eNB according to the determination result or not send indication information; and the eNB is configured to perform a corresponding operation according to the indication information or perform no operation.

The system specifically includes an MCE and a BM-SC, wherein the MCE is configured to save the determination result of the MBMS service and to establish or reject bearing of the MBMS service according to the saved determination result when the BM-SC initiates the MBMS Session Start procedure of the MBMS service.

The disclosure also provides a system for controlling an MBMS service, which includes a network side and UE, wherein the network side is configured to process uplink feedback information from the UE, to make an Activation/Deactivation determination on an MBMS service according to the processing result and to activate/deactivate the MBMS service according to the determination result.

Processing the uplink feedback information from the UE and activating/deactivating the MBMS service according to the processing result by the network side include:

an eNB gathers statistics according to collected uplink feedback information and sends the statistical result to an MCE; the MCE determines whether it is needed to activate/deactivate a corresponding MBMS service according to the statistical result from the eNB, or, the MCE further reports the statistical result to an OAM of the MCE, which then determines whether it is needed to activate/deactivate the corresponding MBMS service according to the statistical result from the eNB;

or, the eNB gathers statistics according to collected uplink feedback information; the eNB makes a preliminary determination on whether it is needed to activate/deactivate the MBMS service according to the statistical result, or, the eNB further reports the statistical result to the OAM of the eNB, which then makes a preliminary determination on whether it is needed to activate/deactivate the MBMS service according to the statistical result, and the eNB sends the preliminary determination result to the MCE; the MCE finally determines whether it is needed to activate/deactivate the corresponding MBMS service according to the preliminary determination result from the eNB, or, the MCE further reports the preliminary determination result from the eNB to the OAM of the MCE, which then finally determines whether it is needed to activate/deactivate the corresponding MBMS service according to the preliminary determination result from the eNB;

or, the eNB forwards the uplink feedback information from the UE to the MCE; the MCE gathers statistics according to collected uplink feedback information; the MCE determines whether it is needed to activate/deactivate the corresponding MBMS service according to the statistical result, or, the MCE further reports the statistical result to the OAM of the MCE, which then determines whether it is needed to activate/deactivate the corresponding MBMS service according to the statistical result.

Activating/deactivating the MBMS service according to the determination result of the MBMS service by the network side includes: if the determination result is a Deactivation determination, the MCE sends the determination result to the BM-SC through an MME, and after the BM-SC receives the determination result sent from the MCE, the BM-SC initiates an MBMS Session Stop procedure of the MBMS service; if the determination result is an Activation determination, the MCE sends the determination result to the BM-SC through the MME, and the BM-SC performs no operation after receiving the determination result, or, the MCE sends no determination result to the BM-SC, and still keeps the transmission of the original MBMS service;

or, if the determination result is a Deactivation determination, the MCE directly sends MBMS service Deactivation indication information to a corresponding eNB, and after the corresponding eNB receives the MBMS service Deactivation indication information, the corresponding eNB stops sending the corresponding MBMS service data on an air interface; if the determination result is an Activation determination, the MCE sends MBMS service Activation indication information or no information to the corresponding eNB, and the corresponding eNB continues sending the corresponding MBMS service data on the air interface.

Activating/deactivating the MBMS service according to the determination result of the MBMS service by the network side includes:

if the determination result is an Activation determination, the MCE sends the determination result to the BM-SC through the MME, and after the BM-SC receives the determination result sent from the MCE, the BM-SC initiates an MBMS Session Start procedure of the corresponding MBMS service; if the determination result is a Deactivation determination, the MCE sends the Deactivation determination to the BM-SC through the MME, and the BM-SC performs no operation after receiving the determination and the non-transmission state of the original MBMS service is kept; or, the MCE sends no determination result to the BM-SC, and the non-transmission state of the original MBMS service is still kept;

or, if the determination result is an Activation determination, the MCE directly sends MBMS service Activation indication information to a corresponding eNB, and the eNB starts to send corresponding MBMS service data on an air interface after receiving the Activation indication information; if the determination result is a Deactivation determination, the MCE sends MBMS service Deactivation indication information or no information to the eNB, and the eNB does not send, the corresponding MBMS service data on the air interface.

Activating/deactivating the MBMS service according to the determination result of the MBMS service by the network side includes: the MCE sends the determination result of the MBMS service; when the BM-SC initiates the MBMS Session Start procedure of the MBMS service, the MCE establishes or rejects bearing of the MBMS service according to the saved determination result.

The technical scheme of the disclosure is described below in further detail in conjunction with specific embodiments.

Embodiment 1

In this embodiment, an MBSFN area consists of three eNBs (eNB A, eNB B, eNB C); in the eNB A, there are two UEs (UE1, UE2) which can provide uplink feedback; in the eNB B, there are three UEs (UE3, UE4, UE5) which can provide uplink feedback; and in the eNB C, there are four UEs (UE6, UE7, UE8, UE9) which can provide uplink feedback. A network side requests all the UEs in the MBSFN area which can provide uplink feedback to provide the feedback of an MBMS service 1, that is, if an UE which can provide uplink feedback is interested in/receiving the MBMS service 1, then the UE provides feedback. In this embodiment, the UE1 in the eNB A provides feedback; the UE3 and the UE4 in the eNB B provide feedback; the UE6, the UE7 and the UE8 in the eNB C provide feedback.

The eNB A, the eNB B and the eNB C perform processing according to the collected feedback information from the UEs, that is to say, the eNB A, the eNB B and the eNB C gather statistics according to the number of UEs providing feedback; namely, the number of UE which is interested in/receiving the MBMS service 1 counted by the eNB A is 1, the number counted by the eNB B is 2 and the number counted by the eNB C is 3, wherein the number is called the statistical result of each eNB respectively. The three eNBs send the statistical results to an MCE.

The MCE receives the statistical results from the eNBs and makes an Activation/Deactivation determination on the MBMS service in the entire MBSFN area; specifically, the MCE synthesizes the statistical results acquired from the three eNBs, this embodiment takes summation for example, that is, the MCE learns that there are six UEs which are interested in/receiving the MBMS service 1; if this value is greater than a threshold, the MCE makes an Activation determination on the MBMS service 1; otherwise, the MCE makes a Deactivation determination on the MBMS service 1. In another way, the MCE reports the statistical result acquired from each eNB to the OAM of the MCE, and the OAM of the MCE then determines the MBMS service according to the statistical results (this determination is implemented manually or by OAM software, belonging to a implementation procedure) to generate a determination result of the MBMS service (Activation or Deactivation).

Embodiment 2

In this embodiment, an MBSFN area consists of three eNBs (eNB A, eNB B, eNB C); in the eNB A, there are two UEs (UE1, UE2) which can provide uplink feedback; in the eNB B, there are three UEs (UE3, UE4, UE5) which can provide uplink feedback; and in the eNB C, there are four UEs (UE6, UE7, UE8, UE9) which can provide uplink feedback. A network side requests all the UEs in the MBSFN area which can provide uplink feedback to provide the feedback of an MBMS service 1, that is, if UE which can provide uplink feedback is interested in/receiving the MBMS service 1, then the UE provides feedback. In this embodiment, the UE1 in the eNB A provides feedback; the UE3 and the UE4 in the eNB B provide feedback; the UE6, the UE7 and the UE8 in the eNB C provide feedback.

The eNB A, the eNB B and the eNB C perform processing according to the collected feedback information from the UE; that is to say, the eNB A, the eNB B and the eNB C gather statistics according to the number of UEs providing feedback, namely, the number of UE which is interested in/receiving the MBMS service 1 counted by the eNB A is 1, the number counted by the eNB B is 2 and the number counted by the eNB C is 3, wherein the number is called the statistical result of each eNB respectively; and then, each eNB determines the MBMS service, wherein the determination refers to one of the following methods. Method 1: each eNB compares the statistical result with a threshold corresponding to the MBMS service; if the statistical result is greater than the threshold, the eNB generates "True" or "1", indicating that the MBMS service should be transmitted (Activation); otherwise, the eNB generates "False" or "0", indicating that the MBMS service should not be transmitted (Deactivation). This embodiment takes the eNB1 generating "False", the eNB2 generating "True" and the eNB3 generating "True" for example; then, each eNB sends a determination result to an MCE. Method 2: the OAM of the eNB determines the MBMS service, generates a determination result of the MBMS service and sends the determination result to the MCE.

The MCE receives the determination result from the eNB and makes an Activation/Deactivation determination on the MBMS service in the entire MBSFN area; specifically, the MCE synthesizes the determination results acquired from the three eNBs; this embodiment takes percentage statistics for example, that is, the MCE learns that there is 66% (2 divided by 3) of eNBs with determination of "True" for the MBMS service 1, the number of eNBs with determination of "True" is relatively bigger (that is, greater than 50%), then the MCE makes an Activation determination on the MBMS service; in anther method, the MCE reports the determination result acquired from each eNB to the OAM of the MCE, and the OAM of the MCE then determines the MBMS service according to the determination result from the eNB (this determination is implemented manually or by OAM software, belonging to an implementation procedure) to generate a determination result of the MBMS service (Activation or Deactivation).

Embodiment 3

In this embodiment, an MBSFN area consists of three eNBs (eNB A, eNB B, eNB C); in the eNB A, there are two UEs (UE1, UE2) which can provide uplink feedback; in the eNB B, there are three UEs (UE3, UE4, UE5) which can provide uplink feedback; and in the eNB C, there are four UEs (UE6, UE7, UE8, UE9) which can provide uplink feedback. A network side requests all the UEs in the MBSFN area which can provide uplink feedback to provide the feedback of an MBMS service 1, that is, if UE which can provide feedback is interested in/receiving the MBMS service 1, then the UE provides feedback. In this embodiment, the UE1 in the eNB A provides feedback; the UE3 and the UE4 in the eNB B provide feedback; the UE6, the UE7 and the UE8 in the eNB C provide feedback.

The eNB does not process the uplink feedback information received from the UE, but directly sends the uplink feedback information to an MCE, that is, the MCE receives the uplink feedback information from the UE forwarded by the eNB.

The MCE collects the uplink feedback information from the UE (that is, UE1, UE3, UE4, UE6, UE7, UE8 in this embodiment) forwarded by the eNB (eNB A, eNB B, eNB C in this embodiment) in the MBSFN area, and performs statistical determination using one of the following methods. Method 1: the MCE gathers statistics of uplink feedback information; this embodiment take summation for example; a summation result is the number of UE which is interested in/receiving the MBMS service 1 and the summation result in this embodiment is 6; the MCE compares the statistical result (the statistical result is 6 in this embodiment) with a threshold corresponding to the MBMS service; if the statistical result is greater than the threshold, it is determined as Activation (indicating that the MBMS service should be transmitted); otherwise, it is determined as Deactivation. Method 2: the MCE gathers statistics of uplink feedback information (the statistical method is the same as Method 1) and reports a statistical result to the OAM of the MCE, and the OAM of the MCE then determines the MBMS service according to the statistical result (this determination is implemented manually or by OAM software, belonging to an implementation procedure) to generate a determination result of the MBMS service (Activation or Deactivation).

Embodiment 4

This embodiment takes an MBMS service 2 for example, wherein the state of the MBMS service 2 is ongoing (an ongoing MBMS service) and the MCE has already made a determination result of the MBMS service (that is, Activation or Deactivation).

Figure 8:
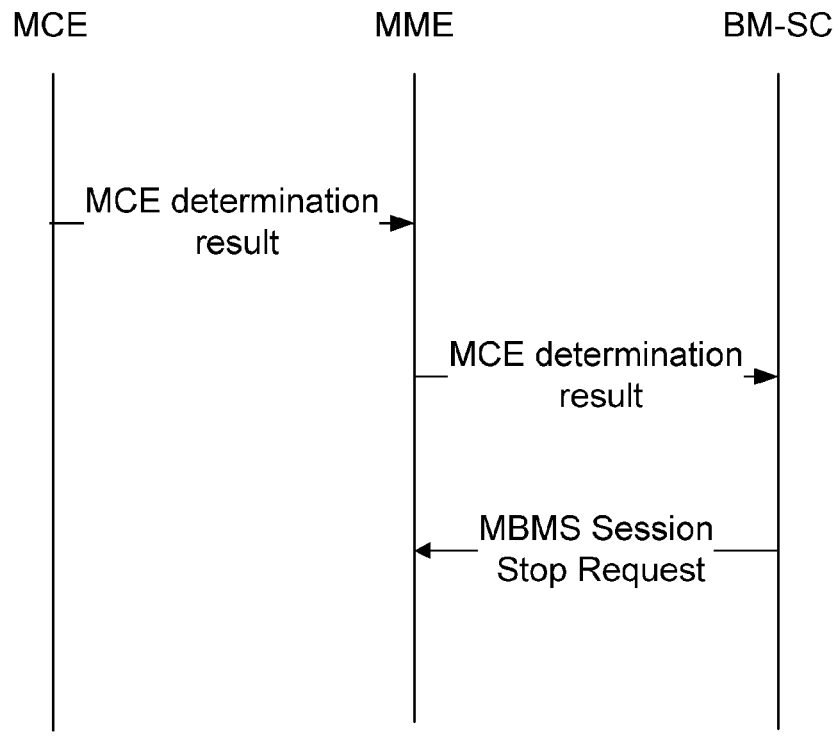
FIG. 8 shows a flowchart of a method for controlling an MBMS service in Embodiment 4 of the disclosure.

If the determination result made by the MCE is Deactivation, the MCE sends the determination result to a BM-SC through an MME; after receiving the Deactivation determination result, the BM-SC triggers a deactivation procedure of the MBMS service 2, that is, an MBMS Session Stop procedure; FIG. 8 shows a flowchart of a method for controlling an MBMS service in Embodiment 4 of the disclosure; as shown in FIG. 8, if the determination result of the MCE is Activation, there are two processing modes at this moment: a. the MCE sends the Activation determination to the BM-SC through the MME; after receiving the determination, the BM-SC performs no operation and the transmission of the original MBMS service 2 is kept; b. the MCE does not send the determination result to the BM-SC and the transmission of the original MBMS service 2 is still kept.

Embodiment 5

This embodiment takes an MBMS service 2 for example, wherein the MBMS service 2 has never been started (that is, the MBMS service has never been transmitted, or the MBMS service has never initiated a Session Start procedure) and the MCE has already made a determination result of the MBMS service (that is, Activation or Deactivation).

Figure 9:
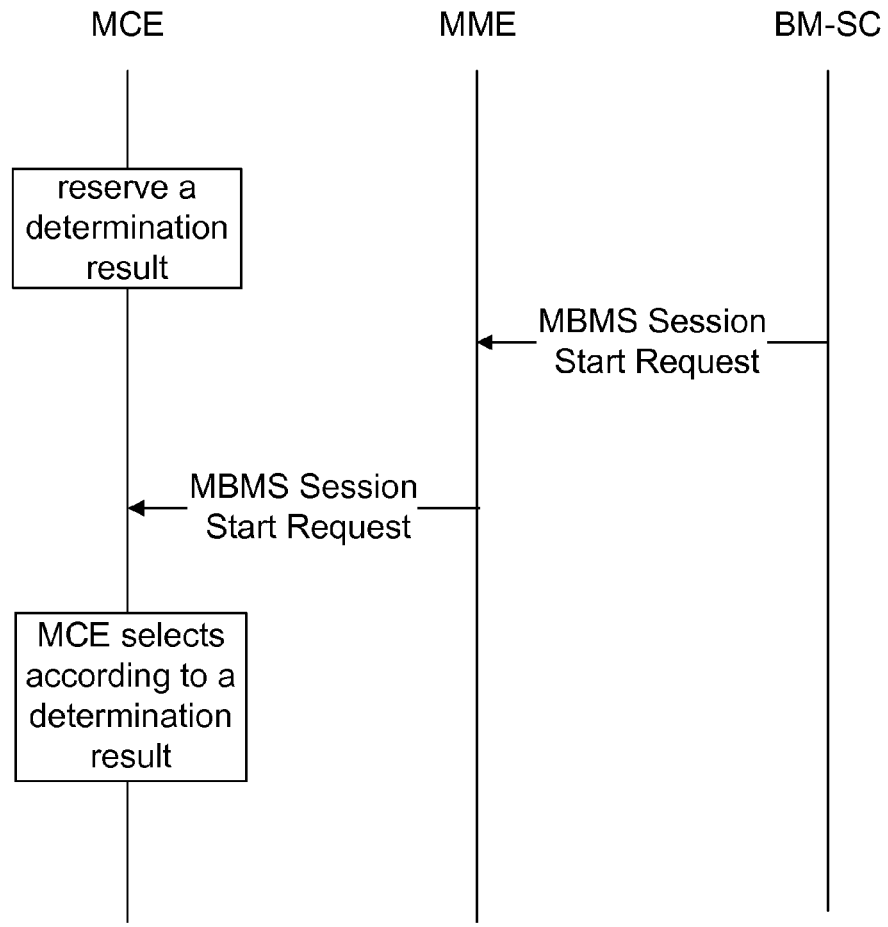
FIG. 9 shows a flowchart of a method for controlling an MBMS service in Embodiment 5 of the disclosure.

FIG. 9 shows a flowchart of a method for controlling an MBMS service in Embodiment 5 of the disclosure; as shown in FIG. 9, the MCE reserves the determination result; when the BM-SCM initiates an MBMS Session Start procedure, the MCE selects to bear (activate) or not bear (deactivate) the MBMS service according to the determination result; that is to say, if the determination of the MCE is Activation, the MCE would continue the MBMS Session Start procedure initiated by the BM-SC; otherwise, the MCE would reject the BM-SC.

Embodiment 6

This embodiment takes an MBMS service 2 for example, wherein the state of the MBMS service 2 is ongoing (ongoing MBMS service) and the MCE has already made a determination result of the MBMS service (that is, Activation or Deactivation).

Figure 10:
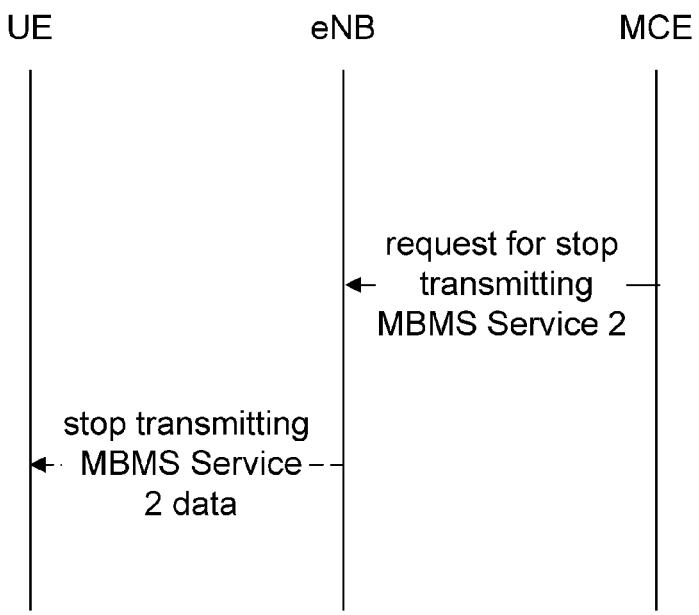
FIG. 10 shows a flowchart of a method for controlling an MBMS service in Embodiment 6 of the disclosure.

FIG. 10 shows a flowchart of a method for controlling an MBMS service in Embodiment 6 of the disclosure; as shown in FIG. 10, if the determination result of the MCE is a Deactivation, the MCE directly sends an MBMS service Stop indication to the eNB; after receiving the MBMS service Stop indication from the MCE, the eNB no longer sends MBMS service data on an air interface; if the determination result of the MCE is Activation (that is, continue the transmission of the MBMS service), the MCE might send MBMS service Continue indication information or no information to the eNB; and the eNB would continue sending the MBMS service data on the air interface.

Further, the MCE does not notify the BM-SC in this embodiment; from the view of BM-SC or MBMS-GW, the eNB is still receiving MBMS data and sending the MBMS data on the air interface.

The above are only the preferred embodiments of the disclosure, and are not intended to limit the scope of protection of the disclosure.

The invention claimed is:

1. A method for controlling a Multimedia Broadcast Multicast Service (MBMS), comprising:
   processing, by a network side, uplink feedback information from UE through gathering statistics according to collected uplink feedback information and sending a statistical result to a Multi-cell/Multicast Coordination Entity (MCE), by an eNB;
   making, by a network side, an Activation/Deactivation determination on an MBMS service according to a processing result through determining, by the MCE, whether it is needed to activate/deactivate a corresponding MBMS service according to the statistical result from the eNB, or, further reporting, by the MCE, the statistical result to an Operation, Administration and Maintenance (OAM) of the MCE, which then determines whether it is needed to activate/deactivate the corresponding MBMS service according to the statistical result from the eNB; and activating/deactivating, by the network side, the MBMS service according to the Activation/Deactivation determination, wherein in a condition that the MBMS service was started but currently is in an Active state, the activating/deactivating, by the network side, the MBMS service according to the Activation/Deactivation determination comprises:

if the determination is a Deactivation determination, then sending, by an MCE, the Deactivation determination to a Broadcast Multicast Service Centre (BM-SC) through a Mobility Management Entity (MME), and after the BM-SC receives the Deactivation determination sent from the MCE, initiating, by the BM-SC, an MBMS Session Stop procedure of the MBMS service;

or, if the determination is a Deactivation determination, then directly sending, by the MCE, MBMS service Deactivation indication information to a corresponding eNB; after the corresponding eNB receives the MBMS service Deactivation indication information, stopping sending, by the corresponding eNB, corresponding MBMS service data on an air interface;

wherein in a condition that the MBMS service was started but currently is in a Deactivated state, the activating/deactivating, by the network side, the MBMS service according to the Activation/Deactivation determination comprises:

if the determination is an Activation determination, then sending, by an MCE, the Activation determination to a BM-SC through an MME, and after the BM-SC receives the Activation determination sent from the MCE, initiating, by the BM-SC, an MBMS Session Start procedure of a corresponding MBMS service;

or, if the determination is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface.

2. The method according to claim 1, wherein the uplink feedback information is an MBMS service the UE is interested in or an MBMS service the UE is receiving;

the gathering statistics, by an eNB, according to collected uplink feedback information comprises: gathering statistics of corresponding UE which is interested in/receiving the MBMS service;

the determining, by the MCE, whether it is needed to activate/deactivate a corresponding MBMS service according to the statistical result from the eNB comprises: adding the statistical result of the MBMS service from each eNB; if the sum is not less than a corresponding threshold, determining that it is needed to activate the corresponding MBMS service; if the sum is less than the corresponding threshold, determining that it is needed to deactivate the corresponding MBMS service;

the determining, by an OAM of the MCE, whether it is needed to activate/deactivate the corresponding MBMS service according to the statistical result from the eNB comprises: determining whether it is needed to activate/deactivate the corresponding MBMS service according to the statistical result from the eNB by OAM software or manually.

3. The method according to claim 1, wherein the gathering statistics according to collected uplink feedback information and sending a statistical result to a Multi-cell/Multicast Coordination Entity (MCE), by an eNB comprises:

gathering statistics, by an eNB, according to collected uplink feedback information;

making a preliminary determination, by the eNB, on whether it is needed to activate/deactivate the MBMS service according to a statistical result, or, further reporting, by the eNB, the statistical result to an OAM of the eNB, which then makes a preliminary determination on whether it is needed to activate/deactivate the MBMS service according to the statistical result, and sending, by the eNB, a preliminary determination result to an MCE;

the determining, by the MCE, whether it is needed to activate/deactivate a corresponding MBMS service according to the statistical result from the eNB comprises: finally determining, by the MCE, whether it is needed to activate/deactivate a corresponding MBMS service according to the preliminary determination result from the eNB, or, further reporting, by the MCE, the preliminary determination result from the eNB to the OAM of the MCE, which then finally determines whether it is needed to activate/deactivate the corresponding MBMS service according to the preliminary determination result from the eNB.

4. The method according to claim 3, wherein the uplink feedback information is an MBMS service the UE is interested in or an MBMS service the UE is receiving;

the gathering statistics, by an eNB, according to collected uplink feedback information comprises: gathering statistics of corresponding UE which is interested in/receiving the MBMS service;

the making a preliminary determination, by the eNB, on whether it is needed to activate/deactivate the MBMS service according to a statistical result comprises: if the statistical result of the MBMS service is not less than a corresponding threshold, then determining that it is needed to activate a corresponding MBMS service; if the statistical result of the MBMS service is less than the corresponding threshold, then determining that it is needed to deactivate the corresponding MBMS service;

the making a preliminary determination, by an OAM of the eNB, on whether it is needed to activate/deactivate the MBMS service according to the statistical result comprises: making a preliminary determination on whether it is needed to activate/deactivate the MBMS service according to the statistical result by OAM software or manually;

the finally determining, by the MCE, whether it is needed to activate/deactivate a corresponding MBMS service according to the preliminary determination result from the eNB comprises: according to the preliminary determination result of the MBMS service from each eNB, determining, by the MCE, that it is needed to activate the MBMS service if the number/percentage of eNBs with preliminary determination results of "Activation Needed" is not less than the number/percentage of eNBs with preliminary determination results of "Deactivation Needed", and determining, by the MCE, that it is needed to deactivate the MBMS service if the number/percentage of eNBs with preliminary determination results of "Activation Needed" is less than the number/percentage of eNBs with preliminary determination results of "Deactivation Needed";

the finally determining, by the OAM of the MCE, whether it is needed to activate/deactivate the corresponding MBMS service according to the preliminary determination result from the eNB comprises: finally determining whether it is needed to activate/deactivate the corresponding MBMS service according to the preliminary determination result from the eNB by OAM software or manually.

5. The method according to claim 1, wherein the gathering statistics according to collected uplink feedback information and sending a statistical result to a Multi-cell/Multicast Coordination Entity (MCE), by an eNB comprises:

forwarding, by an eNB, the uplink feedback information from the UE to an MCE;

gathering statistics, by the MCE, according to collected uplink feedback information;

the determining, by the MCE, whether it is needed to activate/deactivate a corresponding MBMS service according to the statistical result from the eNB comprises: determining, by the MCE, whether it is needed to activate/deactivate a corresponding MBMS service according to a statistical result, or, further reporting, by the MCE, the statistical result to an OAM of the MCE, which then determines whether it is needed to activate/deactivate the corresponding MBMS service according to the statistical result.

6. The method according to claim 5, wherein the uplink feedback information is an MBMS service the UE is interested in or an MBMS service the UE is receiving;

the gathering statistics, by the MCE, according to collected uplink feedback information comprises: gathering statistics of corresponding UE which is interested in/receiving the MBMS service;

the determining, by the MCE, whether it is needed to activate/deactivate a corresponding MBMS service according to the statistical result comprises: if the statistical result of the MBMS service is not less than a corresponding threshold, then determining that it is needed to activate the corresponding MBMS service; if the statistical result of the MBMS service is less than the corresponding threshold, then determining that it is needed to deactivate the corresponding MBMS service;

the determining, by an OAM of the MCE, whether it is needed to activate/deactivate the corresponding MBMS service according to the statistical result comprises: determining whether it is needed to activate/deactivate the corresponding MBMS service according to the statistical result by OAM software or manually.

7. The method according to claim 1, wherein in a condition that the MBMS service has never been started, the activating/deactivating, by the network side, the MBMS service according to the Activation/Deactivation determination comprises:

saving, by an MCE, the Activation/Deactivation determination; when a BM-SC initiates an MBMS Session Start procedure of the MBMS service, establishing or rejecting, by the MCE, bearing of the MBMS service according to the saved the Activation/Deactivation determination.

8. A system for controlling a Multimedia Broadcast Multicast Service (MBMS) service, configured to process uplink feedback information from UE and to make an Activation/Deactivation determination on an MBMS service according to a processing result, and activate/deactivate an MBMS service according to the Activation/Deactivation determination, wherein in a condition that the MBMS service was started but currently is in an Active state, the activating/deactivating the MBMS service according to the Activation/Deactivation determination by the network side comprises:

if the determination is a Deactivation determination, then sending, by an MCE, the Deactivation determination to a BM-SC through an MME, and after the BM-SC receives the Deactivation determination sent from the MCE, initiating, by the BM-SC, an MBMS Session Stop procedure of the MBMS service; or, if the determination is a Deactivation determination, then directly sending, by the MCE, MBMS service Deactivation indication information to a corresponding eNB, and after the corresponding eNB receives the MBMS service Deactivation indication information, stopping sending, by the corresponding eNB, corresponding MBMS service data on an air interface;

or wherein in a condition that the MBMS service was started but currently is in an Deactivated state, the activating/deactivating the MBMS service according to the Activation/Deactivation determination by the network side comprises:

if the determination is an Activation determination, then sending, by an MCE, the Activation determination to an BM-SC through an MME, and after the BM-SC receives the Activation determination sent from the MCE, initiating, by the BM-SC, an MBMS Session Start procedure of a corresponding MBMS service; or, if the determination is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface;

or wherein the activating/deactivating the MBMS service according to the Activation/Deactivation determination by the network side comprises:

saving, by an MCE, the Activation/Deactivation determination; when a BM-SC initiates an MBMS Session Start procedure of the MBMS service, establishing or rejecting, by the MCE, bearing of the MBMS service according to the saved the Activation/Deactivation determination, or wherein in a condition that the MBMS service was started but currently is in an Active state, the activating/deactivating the MBMS service according to the Activation/Deactivation determination comprises:

if the determination is a Deactivation determination, then sending, by an MCE, the Deactivation determination to a BM-SC through an MME, and after the BM-SC receives the Deactivation determination sent from the MCE, initiating, by the BM-SC, an MBMS Session Stop procedure of the MBMS service; or, if the determination is a Deactivation determination, then directly sending, by the MCE, MBMS service Deactivation indication information to a corresponding eNB, and after the corresponding eNB receives the MBMS service Deactivation indication information, stopping sending, by the corresponding eNB, corresponding MBMS service data on an air interface;

or wherein in a condition that the MBMS service was started but currently is in an Deactivated state, the activating/deactivating the MBMS service according to the Activation/Deactivation determination comprises:

if the determination is an Activation determination, then sending, by an MCE, the Activation determination to an BM-SC through an MME, and after the BM-SC receives the Activation determination sent from the MCE, initiating, by the BM-SC, an MBMS Session Start procedure of a corresponding MBMS service; or, if the determination is an Activation determination, then directly sending, by the MCE, MBMS service Activation indication information to a corresponding eNB, and after the corresponding eNB receives the MBMS service Activation indication information, starting to send, by the corresponding eNB, corresponding MBMS service data on an air interface;

or wherein the activating/deactivating the MBMS service according to the Activation/Deactivation determination comprises:

saving, by an MCE, the Activation/Deactivation determination; when a BM-SC initiates an MBMS Session Start procedure of the MBMS service, establishing or rejecting, by the MCE, bearing of the MBMS service according to the saved Activation/Deactivation determination.

9. The system according to claim 8, comprising one of the following apparatus groups A-G:

A. an eNB, an Operation, Administration and Maintenance (OAM) of the eNB, and a Multi-cell/Multicast Coordination Entity (MCE),
wherein the eNB is configured to gather statistics according to collected uplink feedback information and to send a statistical result to the OAM of the eNB;
the OAM of the eNB is configured to make a preliminary determination on whether it is needed to activate/deactivate the MBMS service according to the statistical result and to send a preliminary determination result to the MCE through the eNB; and
the MCE is configured to finally determine whether it is needed to activate/deactivate a corresponding MBMS service according to the preliminary determination result from the eNB;

B. an eNB, an MCE, and an OAM of the MCE,
wherein the eNB is configured to gather statistics according to collected uplink feedback information, to make a preliminary determination on whether it is needed to activate/deactivate the MBMS service according to a statistical result and to send a preliminary determination result to the MCE;
the MCE is configured to report the preliminary determination result from the eNB to the OAM of the MCE; and
the OAM of the MCE is configured to finally determine whether it is needed to activate/deactivate a corresponding MBMS service according to the preliminary determination result from the eNB;

C. an eNB, an MCE, and an OAM of the MCE,
wherein the eNB is configured to gather statistics according to collected uplink feedback information and to send a statistical result to the MCE;
the MCE is configured to further report the statistical result to the OAM of the MCE; and
the OAM of the MCE is configured to determine whether it is needed to activate/deactivate a corresponding MBMS service according to the statistical result from the eNB;

D. an eNB, an MCE, and an OAM of the MCE,
wherein the eNB is configured to forward the uplink feedback information from the UE to the MCE;
the MCE is configured to gather statistics according to collected uplink feedback information and to report a statistical result to the OAM of the MCE; and
the OAM of the MCE is configured to determine whether it is needed to activate/deactivate a corresponding MBMS service according to the statistical result;

E. an eNB and an MCE,
wherein the eNB is configured to gather statistics according to collected uplink feedback information and to send a statistical result to the MCE; and
the MCE is configured to determine whether it is needed to activate/deactivate a corresponding MBMS service according to the statistical result from the eNB;

F. an eNB and an MCE,
wherein the eNB is configured to gather statistics according to collected uplink feedback information, to make a preliminary determination on whether it is needed to activate/deactivate the MBMS service according to a statistical result and to send a preliminary determination result to the MCE; and
the MCE is configured to finally determine whether it is needed to activate/deactivate a corresponding MBMS service according to the preliminary determination result from the eNB;

G. an eNB and an MCE,
wherein the eNB is configured to forward the uplink feedback information from the UE to the MCE; and
the MCE is configured to gather statistics according to collected uplink feedback information and to determine whether it is needed to activate/deactivate a corresponding MBMS service according to a statistical result.

10. The system according to claim 8, comprising one of the following apparatus groups I-III:

I: a Multi-cell/Multicast Coordination Entity (MCE), a Mobility Management Entity (MME) and a Broadcast Multicast Service Centre (BM-SC);
wherein the MCE is configured to send the Activation/Deactivation determination to the BM-SC through the MME or not send the Activation/Deactivation determination to the BM-SC; and
the BM-SC is configured to initiate an MBMS Session Stop procedure of the MBMS service or perform no operation after receiving the Activation/Deactivation determination from the MCE;

II: an MCE and an eNB,
wherein the MCE is configured to directly send indication information to a corresponding eNB according to the Activation/Deactivation determination or not send indication information; and
the eNB is configured to perform a corresponding operation according to the indication information or perform no operation;

III: an MCE and a BM-SC,
wherein the MCE is configured to save the Activation/Deactivation determination of the MBMS service and to establish or reject bearing of the MBMS service according to the saved Activation/Deactivation determination when the BM-SC initiates an MBMS Session Start procedure of the MBMS service.

11. The system according to claim 8, wherein the processing uplink feedback information from the UE and activating/deactivating the MBMS service according to a processing result comprises:

gathering statistics according to collected uplink feedback information and sending a statistical result to an MCE, by an eNB; determining, by the MCE, whether it is needed to activate/deactivate a corresponding MBMS service according to the statistical result from the eNB, or, further reporting, by the MCE, the statistical result to an OAM of the MCE, which then determines whether it is needed to activate/deactivate the corresponding MBMS service according to the statistical result from the eNB;

or, gathering statistics, by the eNB, according to collected uplink feedback information; making a preliminary determination, by the eNB, on whether it is needed to activate/deactivate the MBMS service according to a statistical result, or, further reporting, by the eNB, the statistical result to an OAM of the eNB, which then makes a preliminary determination on whether it is needed to activate/deactivate the MBMS service according to the statistical result, and sending, by the eNB, a preliminary determination result to the MCE; finally determining, by the MCE, whether it is needed to activate/deactivate a corresponding MBMS service according to the preliminary determination result from the eNB, or, further reporting, by the MCE, the preliminary determination result from the eNB to the OAM of the MCE, which then finally determines whether it is needed to activate/deactivate the corresponding MBMS service according to the preliminary determination result from the eNB;

or, forwarding, by the eNB, the uplink feedback information from the UE to the MCE; gathering statistics, by the MCE, according to collected uplink feedback information; determining, by the MCE, whether it is needed to activate/deactivate a corresponding MBMS service according to a statistical result, or, further reporting, by the MCE, the statistical result to the OAM of the MCE, which then determines whether it is needed to activate/deactivate the corresponding MBMS service according to the statistical result.

* * * * *